Figure 1:
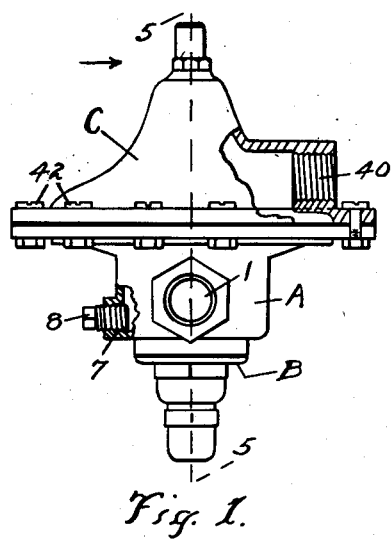
Figure 2:
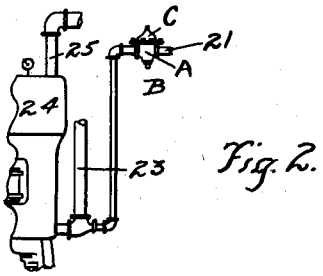
Figure 3:
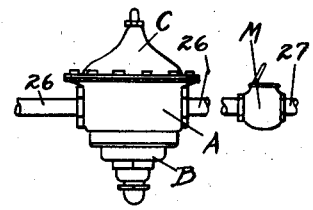
Figures 4, 5:
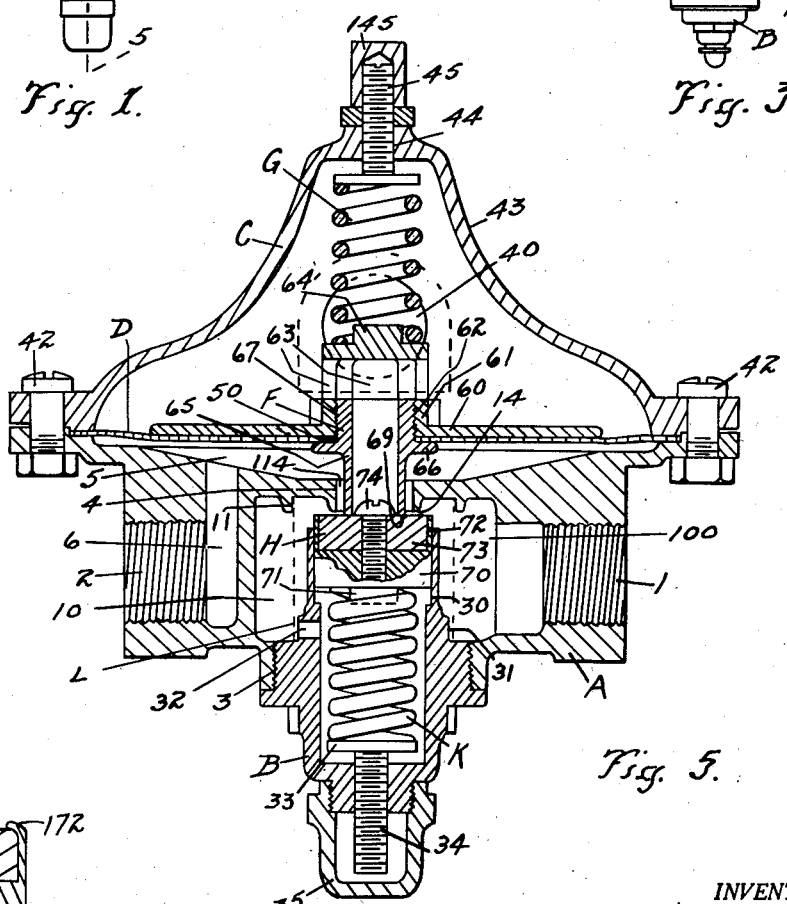

April 4, 1933.                B. E. HORNE                1,903,338
                  PRESSURE REGULATING AND RELIEF VALVE
                    Filed April 3, 1929        2 Sheets-Sheet 1

INVENTOR.
Burchard E. Horne
BY Gardner ...
ATTORNEY.

Patented Apr. 4, 1933 1,903,339

UNITED STATES PATENT OFFICE